United States Patent
Saint-Jalmes et al.

(10) Patent No.: US 9,284,054 B2
(45) Date of Patent: Mar. 15, 2016

(54) DEVICE FOR THE OPTIMIZED STORAGE OF TROLLEYS

(75) Inventors: Bruno Saint-Jalmes, Toulouse (FR); Bernard Rumeau, Levignac-sur-Save (FR); Jason Zaneboni, Blagnac (FR)

(73) Assignee: AIRBUS S.A.S., Blagnac (FR)

( * ) Notice: Subject to any disclaimer, the term of this patent is extended or adjusted under 35 U.S.C. 154(b) by 359 days.

(21) Appl. No.: 13/516,409

(22) PCT Filed: Dec. 15, 2010

(86) PCT No.: PCT/FR2010/000838
§ 371 (c)(1),
(2), (4) Date: Sep. 4, 2012

(87) PCT Pub. No.: WO2011/080414
PCT Pub. Date: Jul. 7, 2011

(65) Prior Publication Data
US 2012/0325960 A1 Dec. 27, 2012

(30) Foreign Application Priority Data
Dec. 17, 2009 (FR) .................... 09 06129

(51) Int. Cl.
*B64D 11/00* (2006.01)
(52) U.S. Cl.
CPC ............ *B64D 11/0007* (2013.01); *B64D 11/00* (2013.01)
(58) Field of Classification Search
CPC ..... B64D 11/00; B64D 11/0007; B64D 11/04
USPC ............... 244/118.5, 118.1; 454/541, 659
See application file for complete search history.

(56) References Cited

U.S. PATENT DOCUMENTS

| | | | | | |
|---|---|---|---|---|---|
| 2,938,686 | A | * | 5/1960 | Lohstreter et al. | 244/118.1 |
| 3,463,334 | A | * | 8/1969 | Longmire et al. | 244/137.1 |
| 3,517,899 | A | * | 6/1970 | Vernon | 186/40 |
| 3,965,969 | A | * | 6/1976 | Williamson | 165/267 |
| 3,999,630 | A | * | 12/1976 | McPhee | 186/40 |
| 4,055,317 | A | * | 10/1977 | Greiss | 244/118.5 |

(Continued)

FOREIGN PATENT DOCUMENTS

| | | |
|---|---|---|
| EP | 0 443 897 | 8/1991 |
| EP | 1 174 340 | 1/2002 |
| WO | 2008 070835 | 6/2008 |

OTHER PUBLICATIONS

International Search Report issued on May 11, 2011 in PCT/FR10/00838 filed on Dec. 15, 2010.

*Primary Examiner* — Tien Dinh
*Assistant Examiner* — Michael A Fabula
(74) *Attorney, Agent, or Firm* — Oblon, McClelland, Maier & Neustadt, L.L.P.

(57) ABSTRACT

A device for stowage of carts including: a first compartment configured to receive carts lined up side by side; a second compartment configured to receive carts lined up side by side, including an aperture allowing cart entry and exit and arranged above the first compartment; a substantially horizontal platform capable of moving in a vertical direction between a lower position in which it is substantially at floor level and a higher position in which it is substantially level with a lower, substantially horizontal wall of the second compartment and facing the opening thereof; and a mechanism arranged in the second compartment for motorized transfer of at least one cart from the second compartment to the platform and vice versa.

17 Claims, 13 Drawing Sheets

(56) References Cited

U.S. PATENT DOCUMENTS

Figure 1:
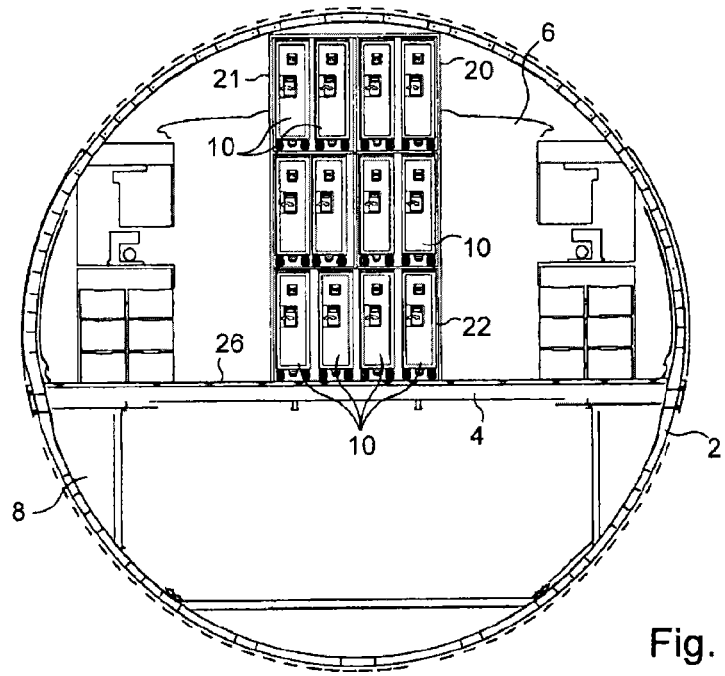

| | | | |
|---|---|---|---|
| RE32,176 E * | 6/1986 | Vernon | 244/118.5 |
| 4,653,707 A * | 3/1987 | Hamilton et al. | 244/137.2 |
| 4,660,787 A * | 4/1987 | Sprenger et al. | 244/118.5 |
| 4,701,097 A * | 10/1987 | Sturtz | 414/495 |
| 4,775,045 A * | 10/1988 | Kuehl | 198/799 |
| 4,804,307 A * | 2/1989 | Motoda | 414/282 |
| 5,074,496 A | 12/1991 | Rezag et al. | |
| 5,205,515 A * | 4/1993 | Luria | 244/118.5 |
| 5,314,143 A * | 5/1994 | Luria | 244/118.1 |
| 5,322,244 A * | 6/1994 | Dallmann et al. | 244/118.5 |
| 5,413,292 A * | 5/1995 | Luria | 244/118.1 |
| 5,496,000 A * | 3/1996 | Mueller | 244/118.1 |
| 5,618,149 A * | 4/1997 | Beaumont et al. | 414/253 |
| 5,626,353 A * | 5/1997 | Campbell | 280/47.35 |
| 5,655,734 A * | 8/1997 | Dahl | 244/137.1 |
| 5,759,005 A * | 6/1998 | Roessner et al. | 414/280 |
| 5,975,830 A * | 11/1999 | Goodrich et al. | 414/541 |
| 6,305,643 B1 * | 10/2001 | Sankrithi | 244/118.1 |
| 6,330,726 B1 * | 12/2001 | Hone et al. | 14/71.5 |
| 6,340,136 B1 * | 1/2002 | Luria | 244/118.1 |
| 6,412,603 B1 * | 7/2002 | Nervig et al. | 187/267 |
| 6,454,208 B1 * | 9/2002 | Nervig et al. | 244/118.1 |
| 6,464,169 B1 * | 10/2002 | Johnson et al. | 244/118.5 |
| 6,547,183 B2 * | 4/2003 | Farnsworth | 244/118.1 |
| 6,721,624 B2 * | 4/2004 | Ostro | 700/213 |
| 6,761,332 B1 * | 7/2004 | Bengtsson | 244/118.5 |
| 6,776,263 B2 * | 8/2004 | Gottlieb et al. | 187/251 |
| 6,808,142 B2 * | 10/2004 | Oki | 244/118.1 |
| 6,971,608 B2 * | 12/2005 | Harrington et al. | 244/118.5 |
| 7,080,806 B2 * | 7/2006 | Mills | 244/118.1 |
| 7,086,677 B2 * | 8/2006 | Boe et al. | 294/81.51 |
| 7,128,186 B2 * | 10/2006 | Ganiere | 182/63.1 |
| 7,137,593 B2 * | 11/2006 | Baatz | 244/118.5 |
| 7,159,821 B2 * | 1/2007 | Harrington et al. | 244/118.5 |
| 7,275,715 B2 * | 10/2007 | McCoskey et al. | 244/118.1 |
| 7,318,566 B2 * | 1/2008 | Hubenthal et al. | 244/137.2 |
| 7,494,091 B2 * | 2/2009 | Harrington et al. | 244/118.5 |
| 7,584,926 B2 * | 9/2009 | Harrington et al. | 244/118.5 |
| 7,780,114 B2 * | 8/2010 | Doebertin et al. | 244/118.5 |
| 7,954,761 B2 * | 6/2011 | Johnson et al. | 244/118.5 |
| 8,011,617 B2 * | 9/2011 | Curry et al. | 244/118.1 |
| 8,087,611 B2 * | 1/2012 | Arnold et al. | 244/118.1 |
| 8,157,211 B2 * | 4/2012 | Lynas | 244/118.5 |
| 8,322,654 B2 * | 12/2012 | Gomes et al. | 244/118.5 |
| 8,360,364 B2 * | 1/2013 | Guering et al. | 244/118.5 |
| 8,371,527 B2 * | 2/2013 | Girlich | 244/118.5 |
| 8,387,916 B2 * | 3/2013 | Baatz et al. | 244/118.5 |
| 8,500,384 B2 * | 8/2013 | Quirion | 414/541 |
| 8,519,824 B1 * | 8/2013 | Rankin et al. | 340/10.1 |
| 8,602,169 B2 * | 12/2013 | Fairchild | 187/262 |
| 2001/0045326 A1 * | 11/2001 | Gottlieb et al. | 187/254 |
| 2002/0148928 A1 * | 10/2002 | Oki | 244/118.1 |
| 2003/0025036 A1 * | 2/2003 | Farnsworth | 244/118.1 |
| 2005/0133308 A1 * | 6/2005 | Reysa et al. | 186/40 |
| 2005/0211832 A1 * | 9/2005 | Baatz | 244/118.1 |
| 2005/0224646 A1 * | 10/2005 | Mills | 244/118.5 |
| 2005/0244254 A1 * | 11/2005 | Schratt et al. | 414/281 |
| 2005/0254930 A1 * | 11/2005 | Weinstein et al. | 414/659 |
| 2006/0061243 A1 * | 3/2006 | Van Loon et al. | 312/330.1 |
| 2006/0182581 A1 * | 8/2006 | Murray et al. | 414/541 |
| 2006/0186268 A1 * | 8/2006 | Harrington et al. | 244/118.5 |
| 2007/0215754 A1 * | 9/2007 | Hubenthal et al. | 244/137.1 |
| 2008/0001031 A1 * | 1/2008 | Doebertin et al. | 244/118.1 |
| 2008/0136299 A1 | 6/2008 | Peurifoy | |
| 2009/0114770 A1 | 5/2009 | Harrington et al. | |
| 2010/0054900 A1 * | 3/2010 | Houtveen et al. | 414/541 |
| 2010/0140398 A1 * | 6/2010 | Cunningham et al. | 244/118.5 |
| 2010/0155531 A1 * | 6/2010 | Lynas | 244/118.5 |
| 2010/0187356 A1 * | 7/2010 | Guering et al. | 244/118.5 |
| 2011/0233882 A1 * | 9/2011 | Belanger et al. | 280/47.35 |

* cited by examiner

DEVICE FOR THE OPTIMIZED STORAGE OF TROLLEYS

BACKGROUND OF THE INVENTION

1. Field of the Invention

This invention relates to an optimized device for stowage of carts.

2. Description of Related Art

In an aircraft, carts are used in particular for serving and storing meals. Meals generally are prepared in technical areas called kitchens or galleys and then are arranged in carts to be served to the passengers. Carts, however, also may be used for other purposes: they may, for example, contain all types of objects, such as garments, garments on hangers, newspapers, dishes; technical, medical, equipment, . . . .

Although most especially intended for a use in an aircraft, this invention is not limited to aircraft but relates more generally to all means of transport intended to accommodate a large number of passengers.

In an aircraft, the carts, also called trolleys, generally are stowed in compartments when they are not being used for service. The floor of these compartments is flush with the floor of the cabin in which they are located. The space above the compartment generally is fitted out as a work surface or receives equipment items such as ovens, coffee machines, stowage units, etc.

In this way, the cabin attendants on board the aircraft have carts in direct proximity to the place where the meals to be distributed are prepared and warmed up. Since all the carts are stowed on the same level, however, on the floor of the corresponding cabin, a considerable area of this cabin must be devoted to stowage of the said carts. This area is occupied to the detriment of available space for putting in seats and accommodating passengers.

In order to limit the area of a cabin accommodating passengers, it already has been proposed to lay out a part of the hold of the aircraft for accommodating carts therein.

Thus, for example, the document FR-2 658 488 discloses a system for providing an aircraft cabin with carts. The disclosed system comprises a storage container in which carts are arranged and which is located in the hold of the aircraft. A controllable robot is provided in the hold and is able to move therein in order to grasp in the said container each of the carts that are arranged therein in order then to convey them into the cabin of the aircraft through a passage implemented between the hold and the cabin. A programmable control unit is connected to the controllable robot and contains information items concerning the position of the carts in the container and the type of products contained in each of the said carts. In that way, according to the information items transmitted by the programmable control unit, the robot moves in order to grasp the corresponding cart and convey it from the hold to the cabin of the aircraft.

Such a solution makes it possible to save space in the cabin of the aircraft and in this way therefore makes it possible to provide for a greater number of passengers for a given area. In order to implement passage of the carts between the hold and the cabin, however, it is necessary to provide at least one passage in the floor of the cabin. This requires an adjustment of the structure of the aircraft and makes it necessary in particular to provide reinforcements at the passage implemented. The hold space that accommodates the carts also must be pressurized and air-conditioned. It likewise is noted that this solution limits the space of the hold, then negatively affecting the capacities of the aircraft for carrying freight. It also is advisable to position the kitchens judiciously in the cabin of the aircraft so that the carts in the hold are close to the kitchens without, however, hindering the arrangement of the remaining freight zone for accommodating the rest of the freight intended to be placed in the aircraft.

BRIEF SUMMARY OF THE INVENTION

This invention then has as a purpose to provide means making it possible to reduce the flooring area needed in a cabin for stowage of carts without, however, impacting the structure of the aircraft or limiting the space available in the hold and intended in particular for receiving freight.

To this end, it proposes a device for the stowage of carts in a space including a floor, the said device comprising a first compartment adapted for receiving at least one cart as well as a second compartment adapted for receiving at least one cart and having an opening allowing entry and exit of carts.

According to this invention, the second compartment is arranged above the first compartment, and the device further comprises:

a platform more or less parallel to the floor and able to move along a direction perpendicular to the said floor from a high position in which it is more or less at a more or less horizontal lower wall of the second compartment facing the opening thereof and a low position in which it is more or less at the floor (26), and means for transfer of at least one cart arranged in the second compartment from the second compartment to the platform and vice versa.

In this way carts may be stowed upright in relation to the floor of the space, in that way making it possible to save space in terms of area. The second compartment preferably is perfectly aligned upright in relation to the first compartment, but the scope of the invention would not be overstepped with a second compartment having an offset in relation to the first compartment. Furthermore, it should be specified that the second compartment is not necessarily directly above the first compartment. As emerges from the attached drawings and from the description that follows, equipment items may be located between the first compartment and the second compartment. If the carts are intended for the transport and distribution of meals, there may be provided for example between the first compartment and the second compartment equipment items for the preparation of meals: ovens, coffee machines, stowage for ingredients, . . . and/or just a work surface. The distance separating the first compartment and the second compartment preferably is adapted to the available under-ceiling height so as to make best use of all the available space. Finally, when the platform is in its low position, since it is at the floor, or more or less at the floor, it does not prevent the passage of persons and may serve as work space for example for the cabin attendants who are manipulating the carts.

In a device according to the invention, the platform moves along a direction more or less perpendicular to the floor. In this way, if the floor is horizontal, the platform itself also will be in a horizontal position and will move along a vertical direction.

In a first embodiment, it is proposed that the transfer means comprise a drawer having a horizontal lower face and at least one vertical side wall. Such a drawer preferably may contain several carts. In that way, manipulation of a single drawer makes it possible to act on several carts. Since one cart at a time generally is not used, it is preferable to limit the manipulations and it therefore is advantageous to move several carts in the same operation. The horizontal lower face is designed for receiving one or more carts. As for the vertical side walls, they are designed in particular for securing the carts and preventing them from falling during a manipulation. In this way, of course, the scope of the invention would not be overstepped if other means were considered for supporting the carts during manipulation thereof.

The transfer means also, for example, may comprise on the one hand a motor fixed in relation to the second compartment and on the other hand a motor fixed in relation to the platform, each motor driving a cogwheel meshing with a rack fastened onto the drawer parallel to the direction of transfer. There it is a matter of a preferred embodiment for accomplishing the transfer of a drawer to a corresponding platform.

The drawer in this embodiment advantageously has a retractable side wall so as to facilitate entry and exit of carts in the drawer when the drawer is more or less at the floor.

The first compartment and the second compartment are arranged for example in a unit which may be likened to a rack in which the carts come to be stowed. As suggested above, this unit also may contain equipment items for the preparation of meals.

As regards the platform, this is for example a platform of a cargo hoist comprising a vertical column along which the platform moves with the aid of motorized drive means. Any type of drive may be considered here: electric motor and drive-belts, hydraulic jacks, electro-hydraulic mechanism, scissor lift with a guidance system, magnetic mechanism, . . . . All these drive means preferably may be disengaged so as to be able to be operated manually in case of failure. A preferred embodiment provides that the column and the motorized drive means are accommodated in a cabinet, if only for safety reasons. This solution, however, is also advantageous because it likewise makes it possible to plan to arrange stowage drawers in the said cabinet thus allowing an optimization of the space.

This invention also relates to an aircraft cabin, characterized in that it comprises a device such as described above. Advantageously, for a better optimization of the use of the area in the cabin, the device will be arranged so that its platform is at an aisle of the cabin. The space used for manipulation of the carts then is a space that furthermore is used for transit of passengers or members of the crew (flight or cabin).

It also relates to an aircraft fuselage comprising a door at which there is a transverse aisle, characterized in that it further comprises a device for optimized stowage of carts such as described above. By "a door" there should be understood here a set of two facing doors. In such an aircraft fuselage, the platform of the device for optimized stowage of carts advantageously is at the transverse aisle. In this way the space in which the platform moves during manipulation of carts also may be used as a passage for access to the corresponding door. In that way, the space in the fuselage is further optimized.

DETAILED DESCRIPTION OF THE PREFERRED EMBODIMENTS

Figure 2:
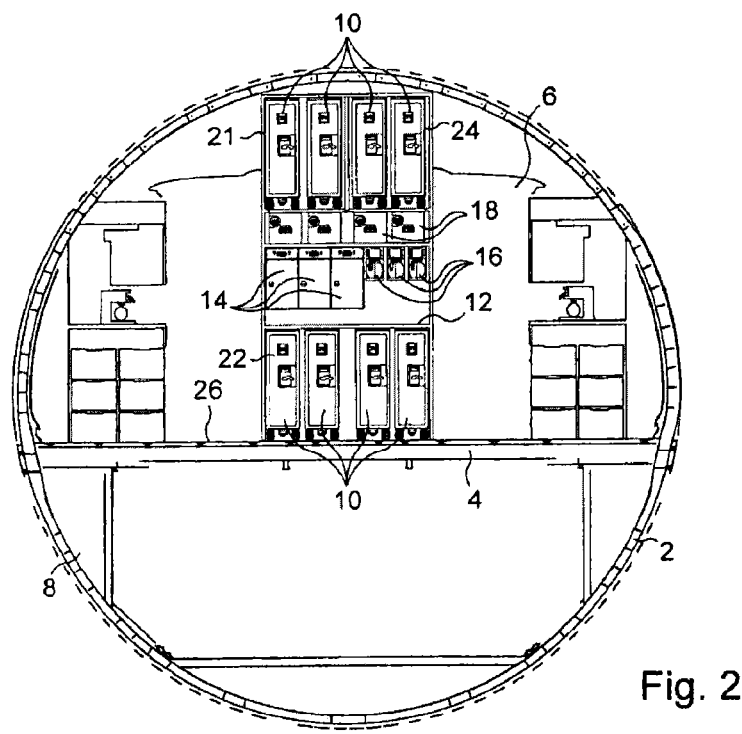
Figure 3:
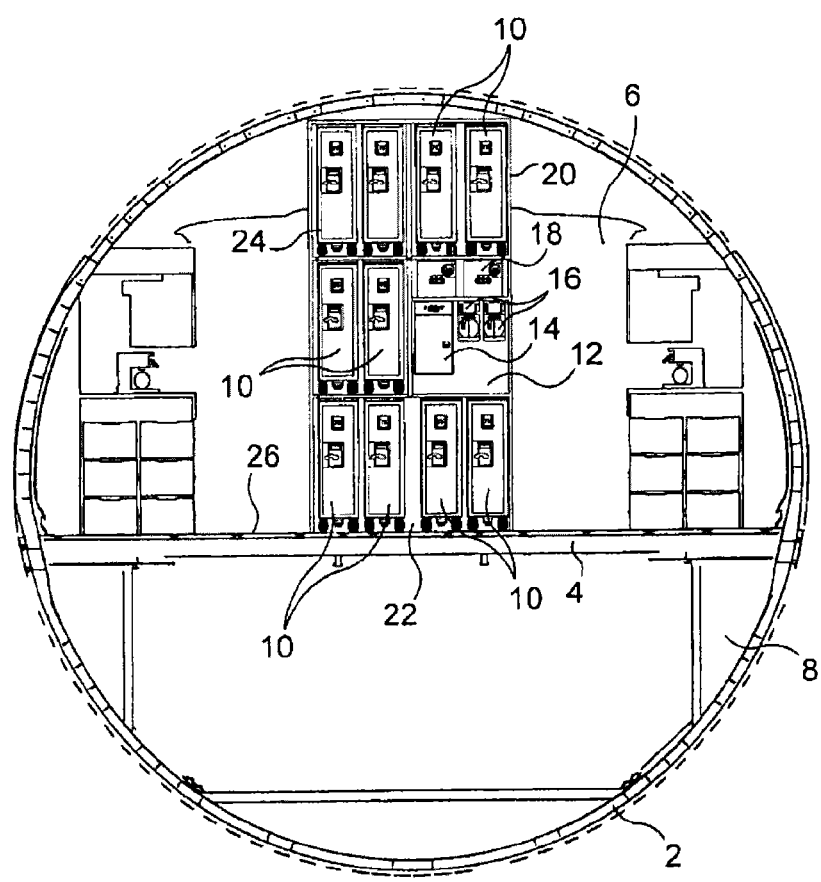
Figure 4:
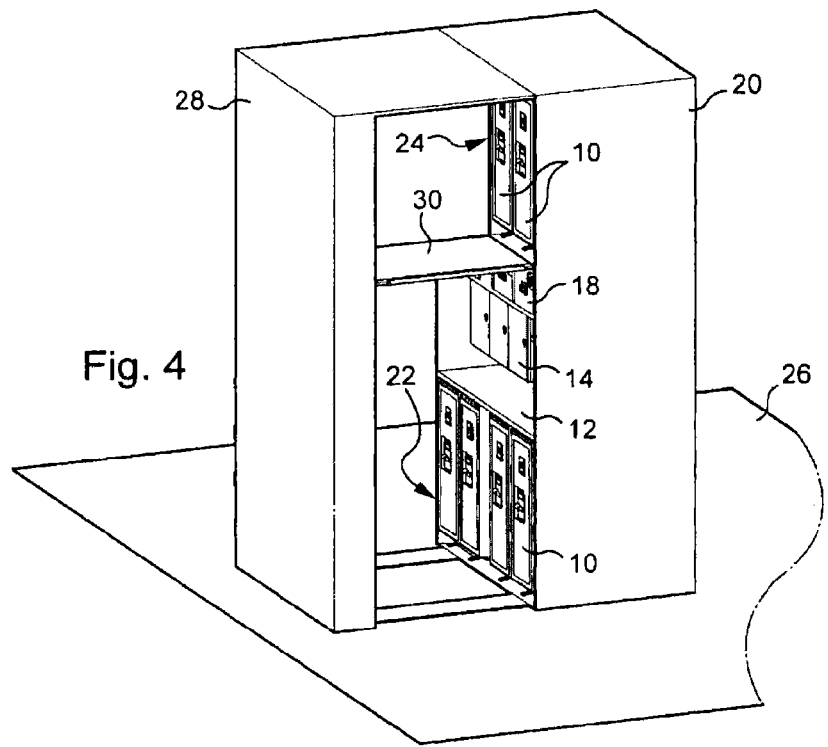
Figure 5:
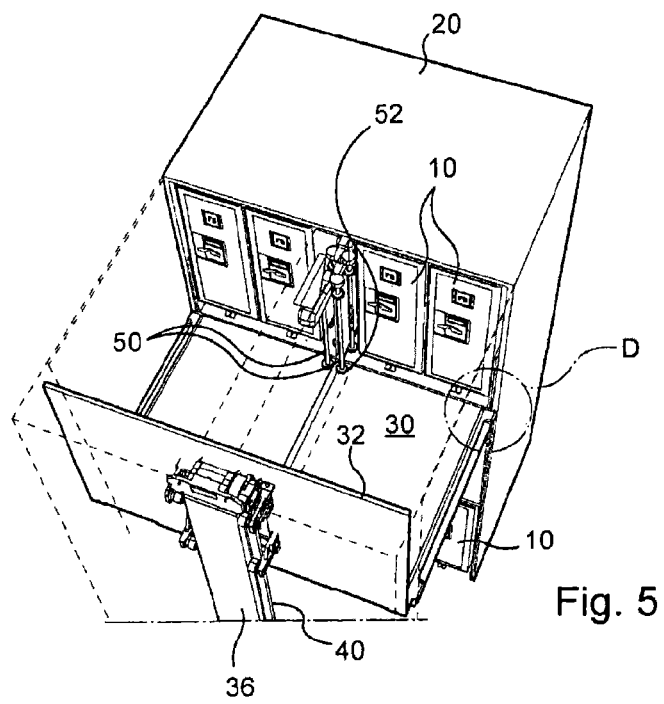
Figure 6:
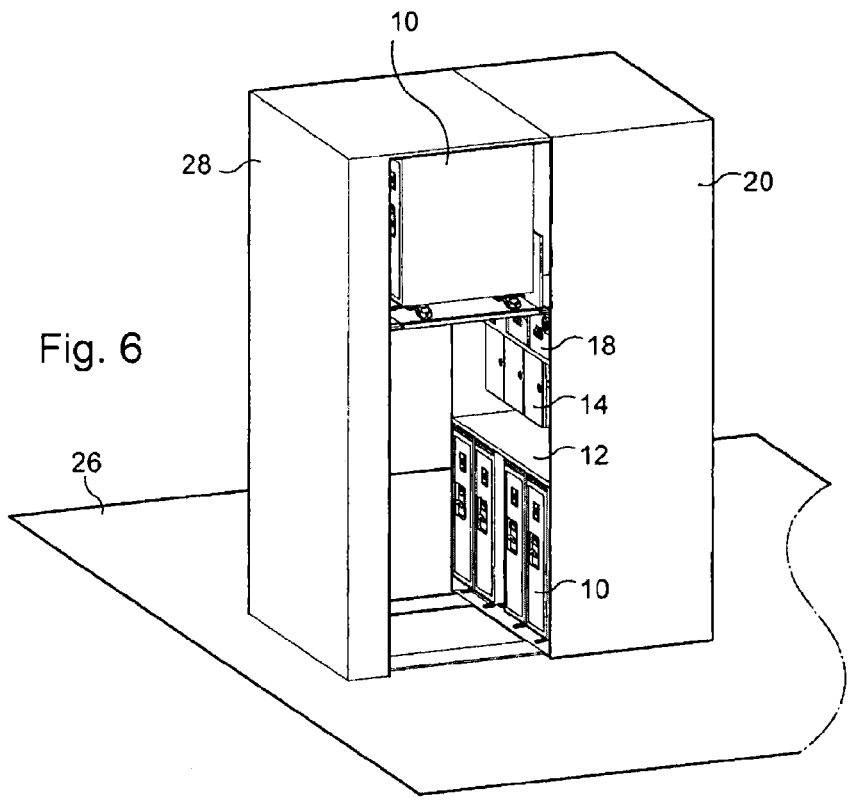
Figure 7:
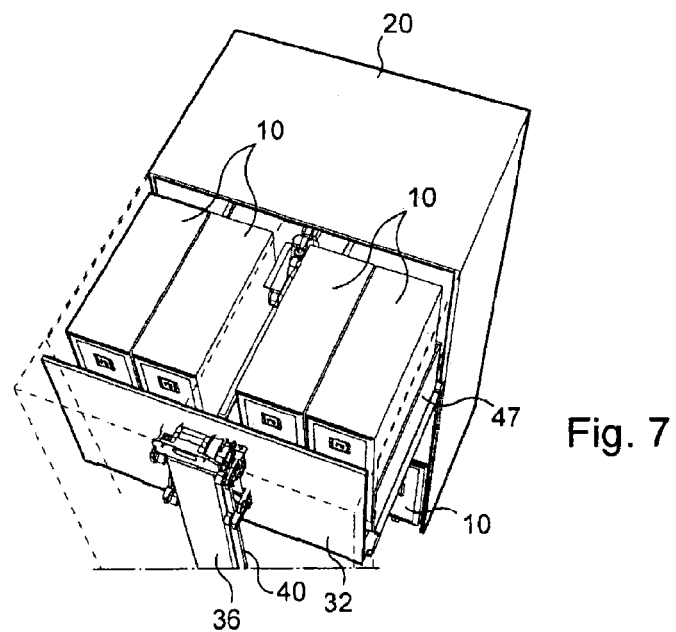
Figure 8:
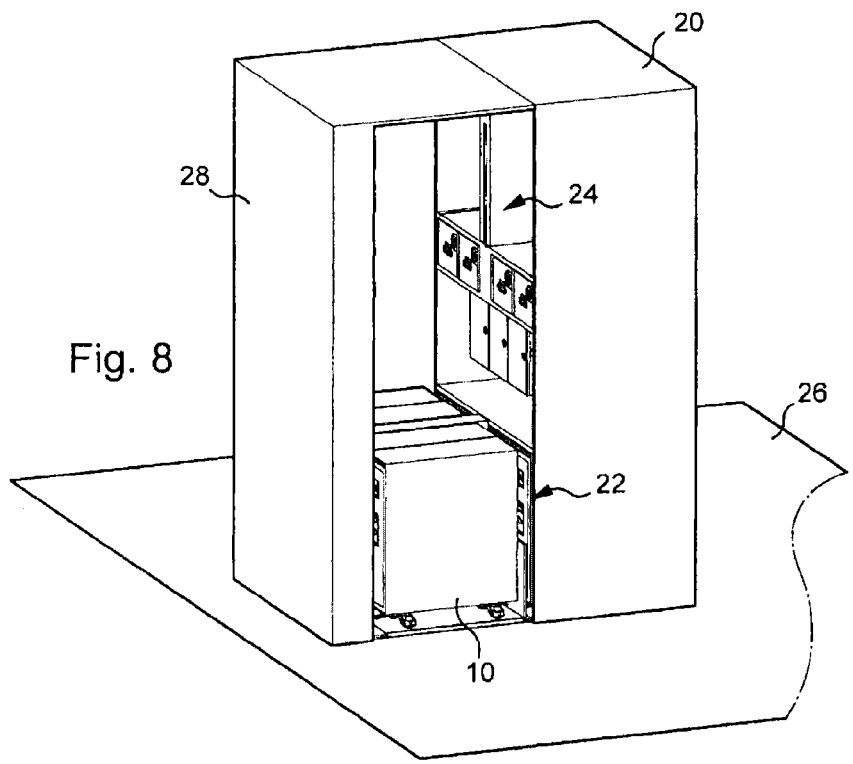
Figure 9:
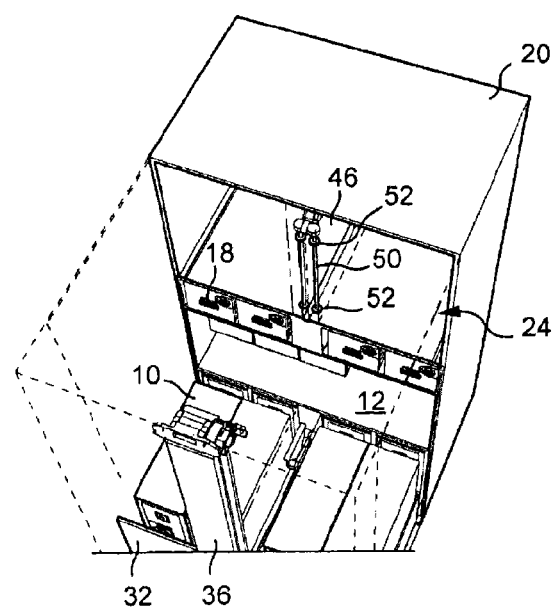

Details and advantages of this invention will become more apparent from the description that follows, presented with reference to the attached schematic drawings on which:

FIG. 1 is a view in cross section of an aircraft fuselage equipped with a device according to this invention, FIGS. 2 and 3 are views similar to FIG. 1 for two embodiment variants, FIG. 4 is a view in perspective of the entire device according to this invention, FIG. 5 is a view in perspective on an enlarged scale partially showing the device of FIG. 4 from above, FIG. 6 is a view corresponding to FIG. 4 of the same device in another position, FIG. 7 is a view similar to FIG. 5 showing the same device in another position, FIG. 8 is a view similar to FIGS. 4 and 6 showing the device according to the invention in a third position, FIG. 9 is a view similar to the views of FIGS. 5 and 7 showing the same device in this third position.

Figure 10:
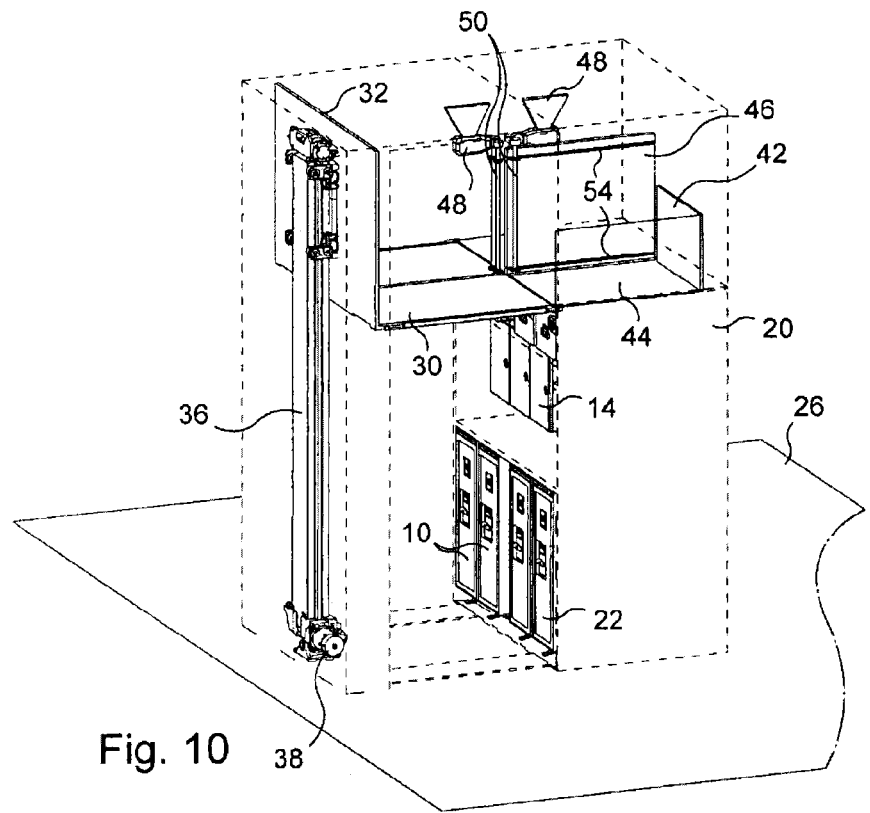
Figure 11:
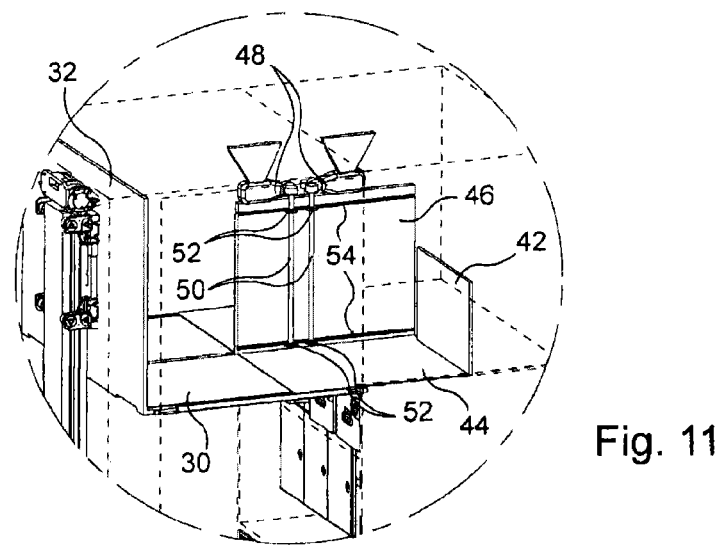
Figure 12:
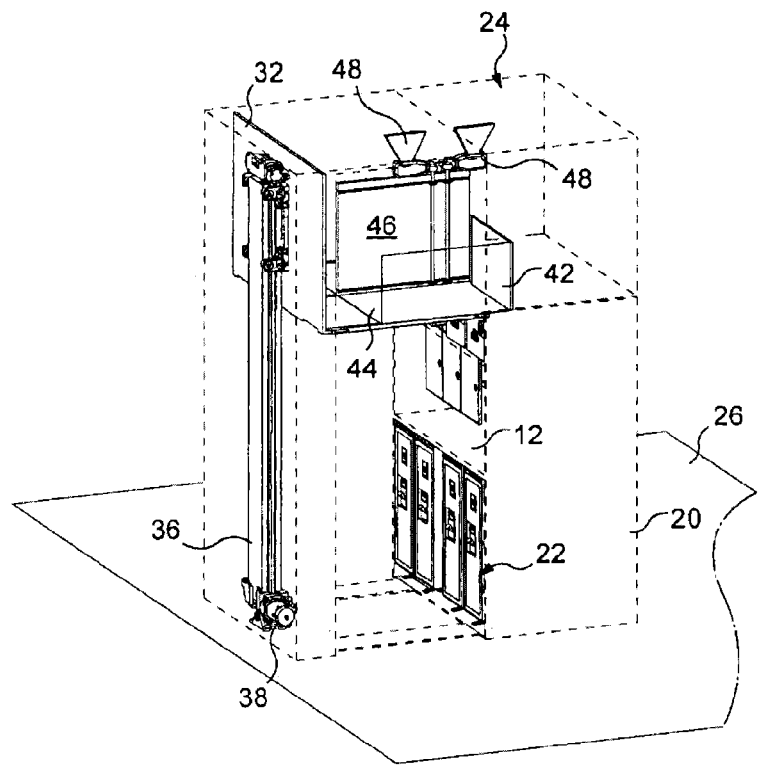
Figure 13:
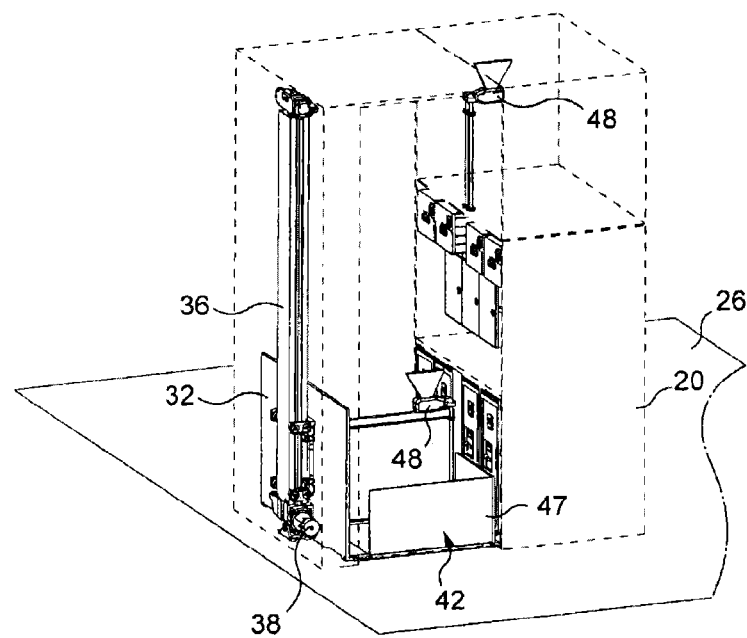
Figure 14:
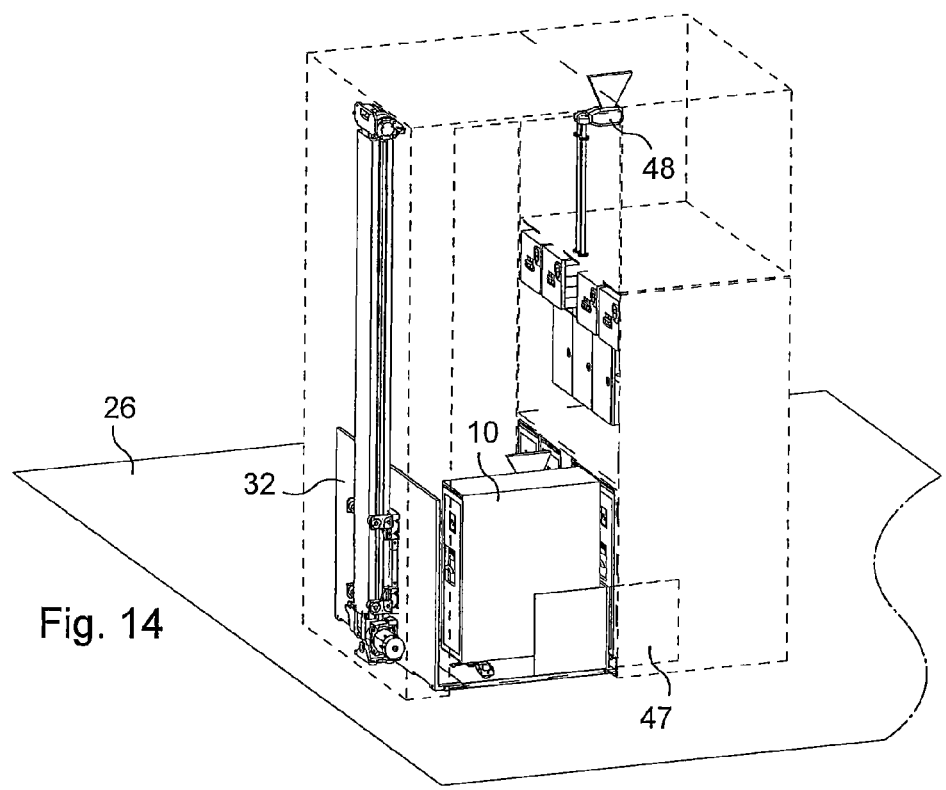
Figure 15:
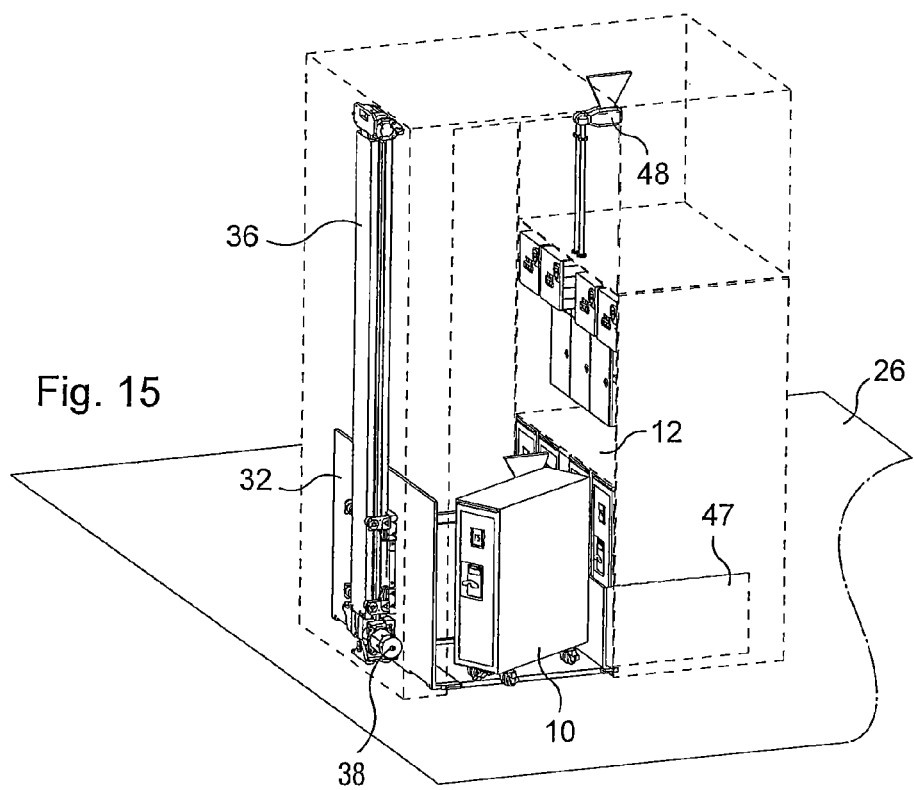
Figure 16:
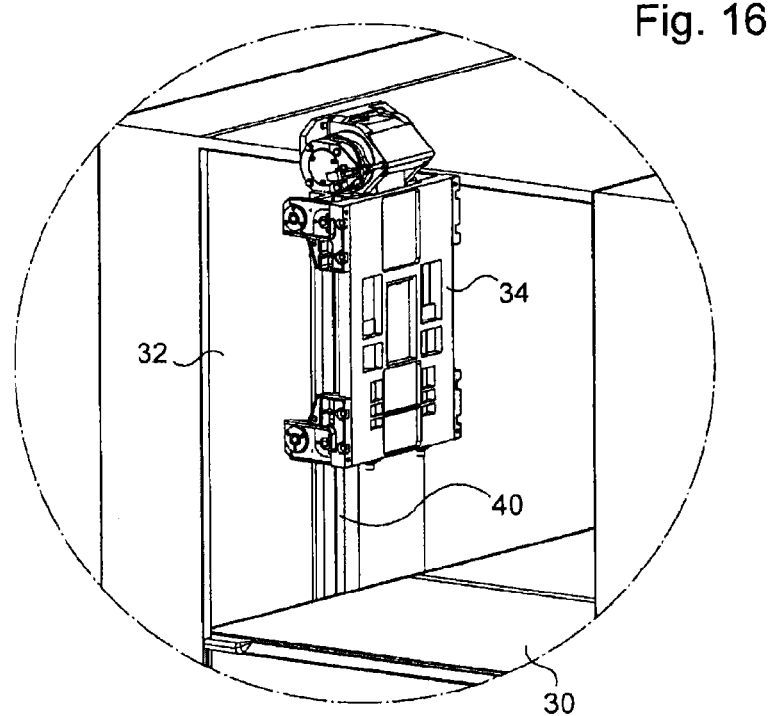
Figure 17:
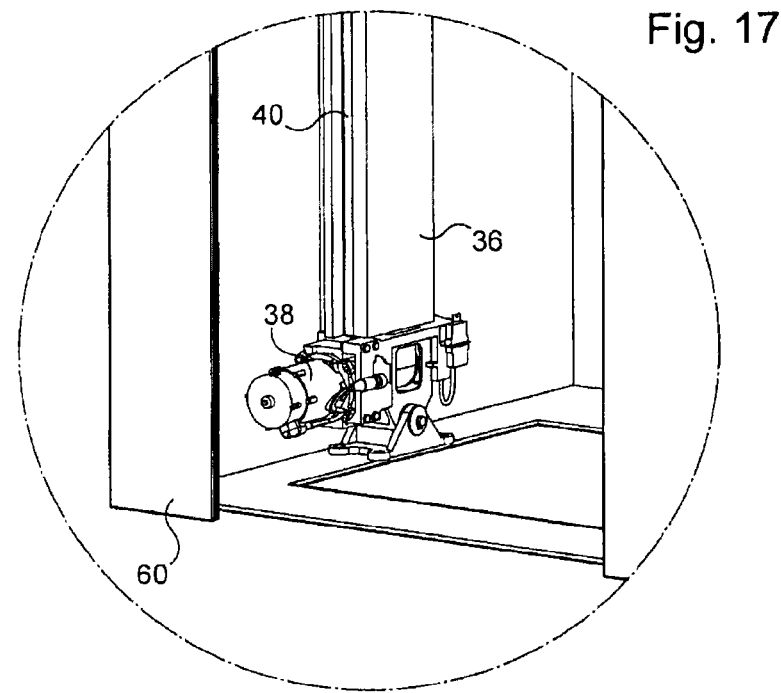
Figure 18:
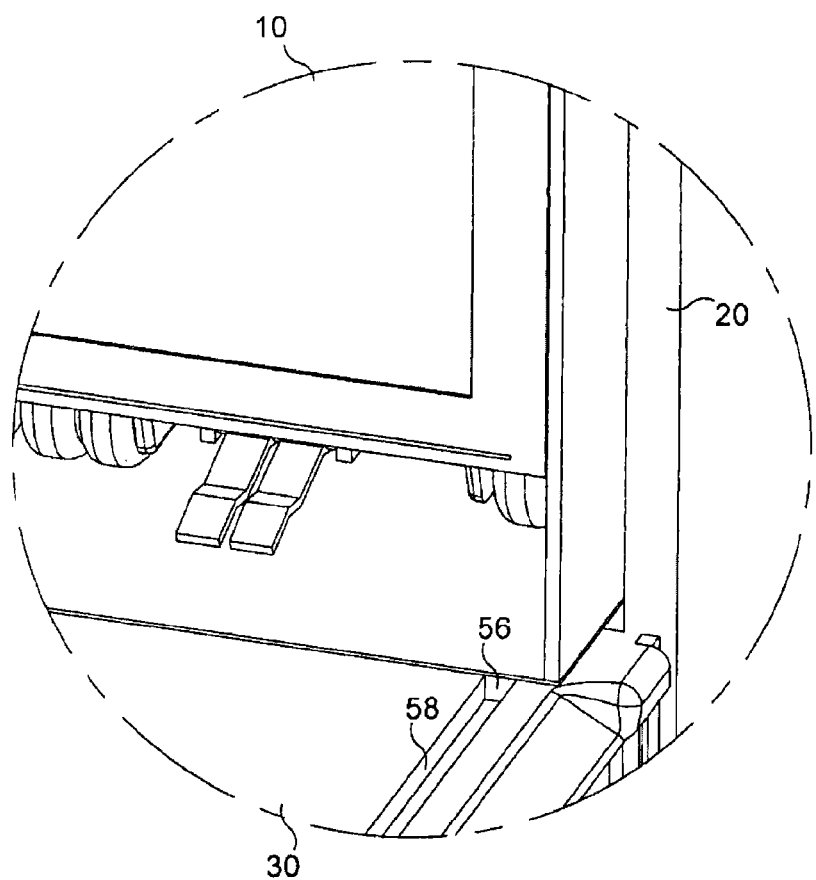
Figure 19:
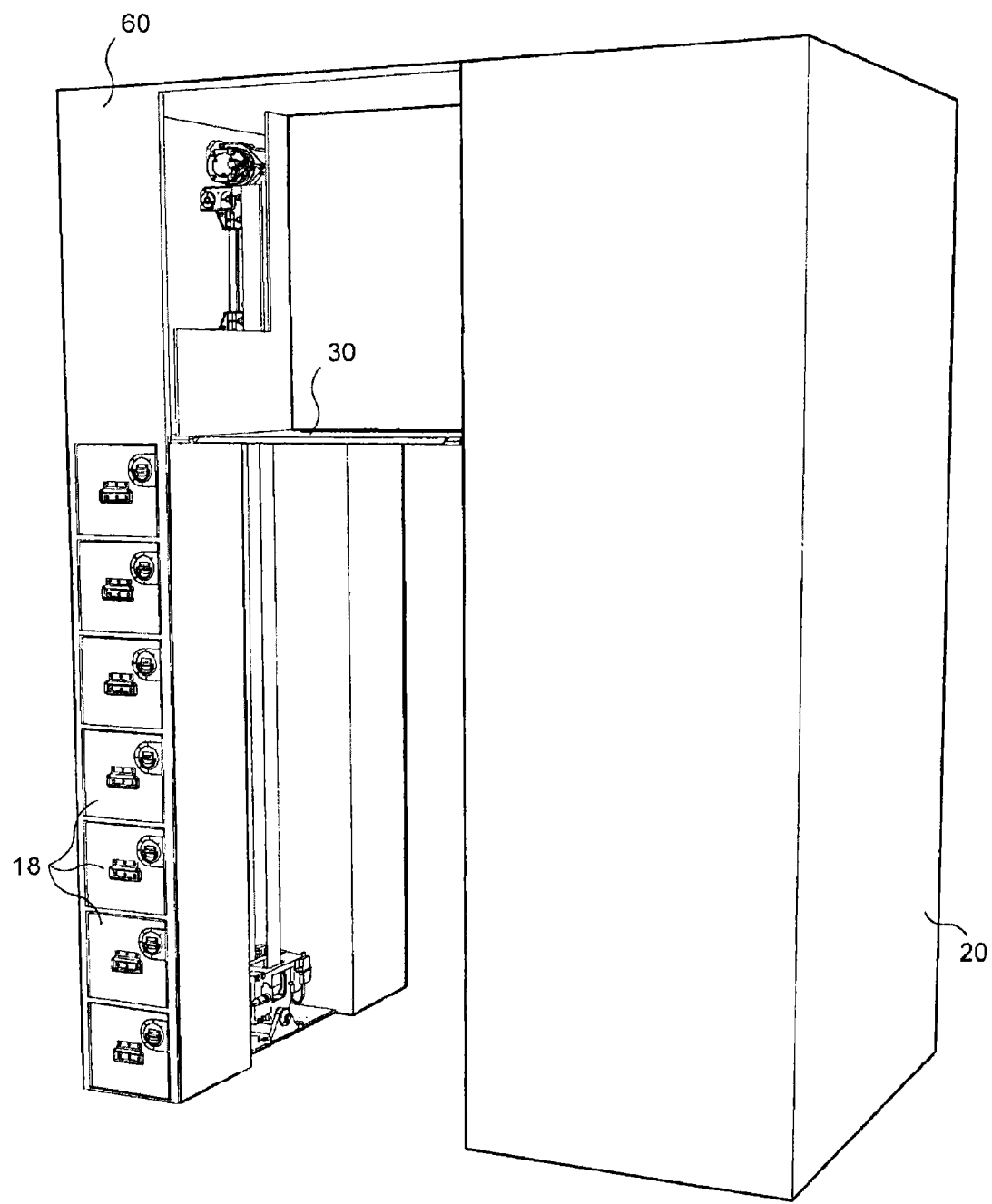
Figure 20:
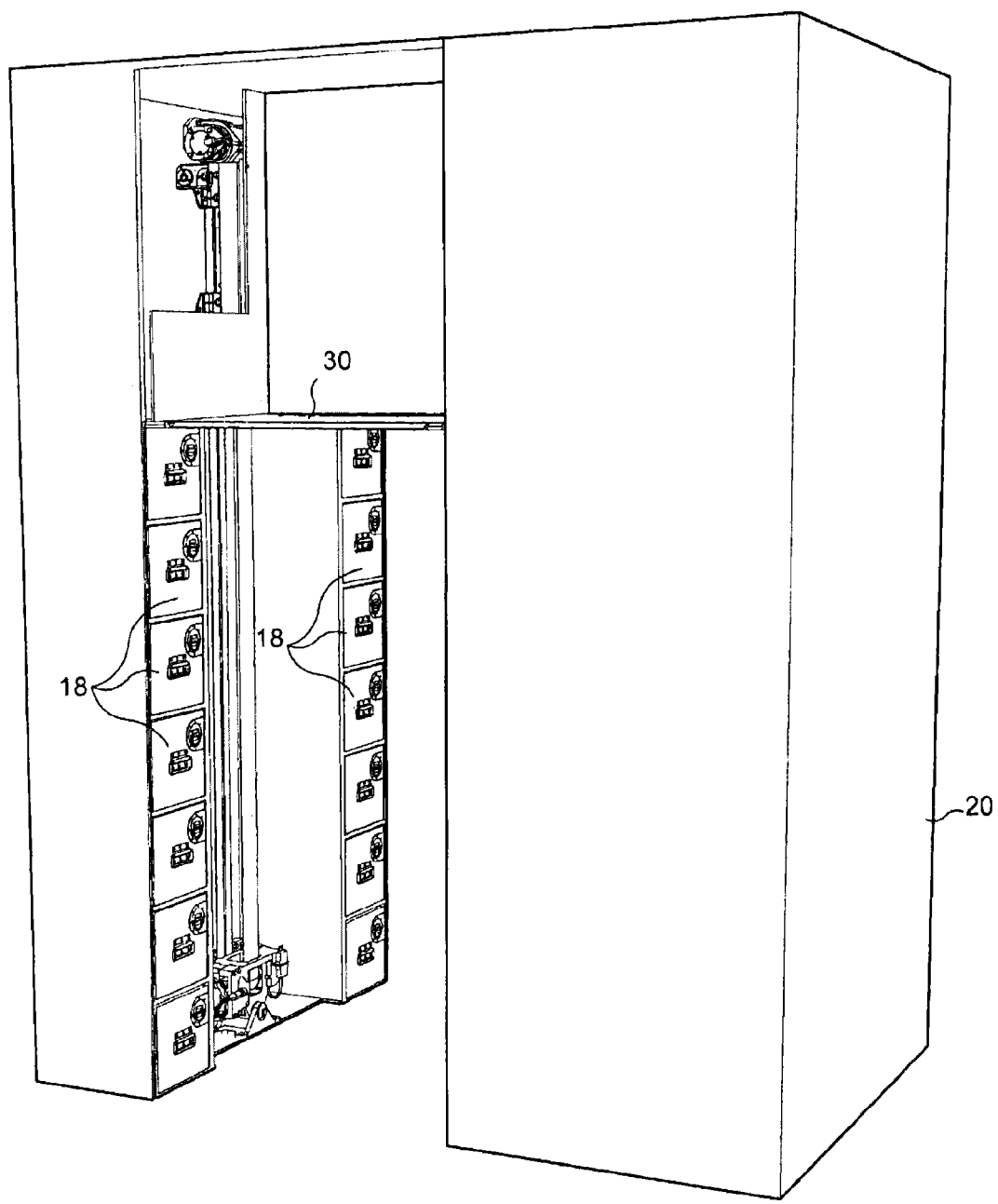
Figure 21:
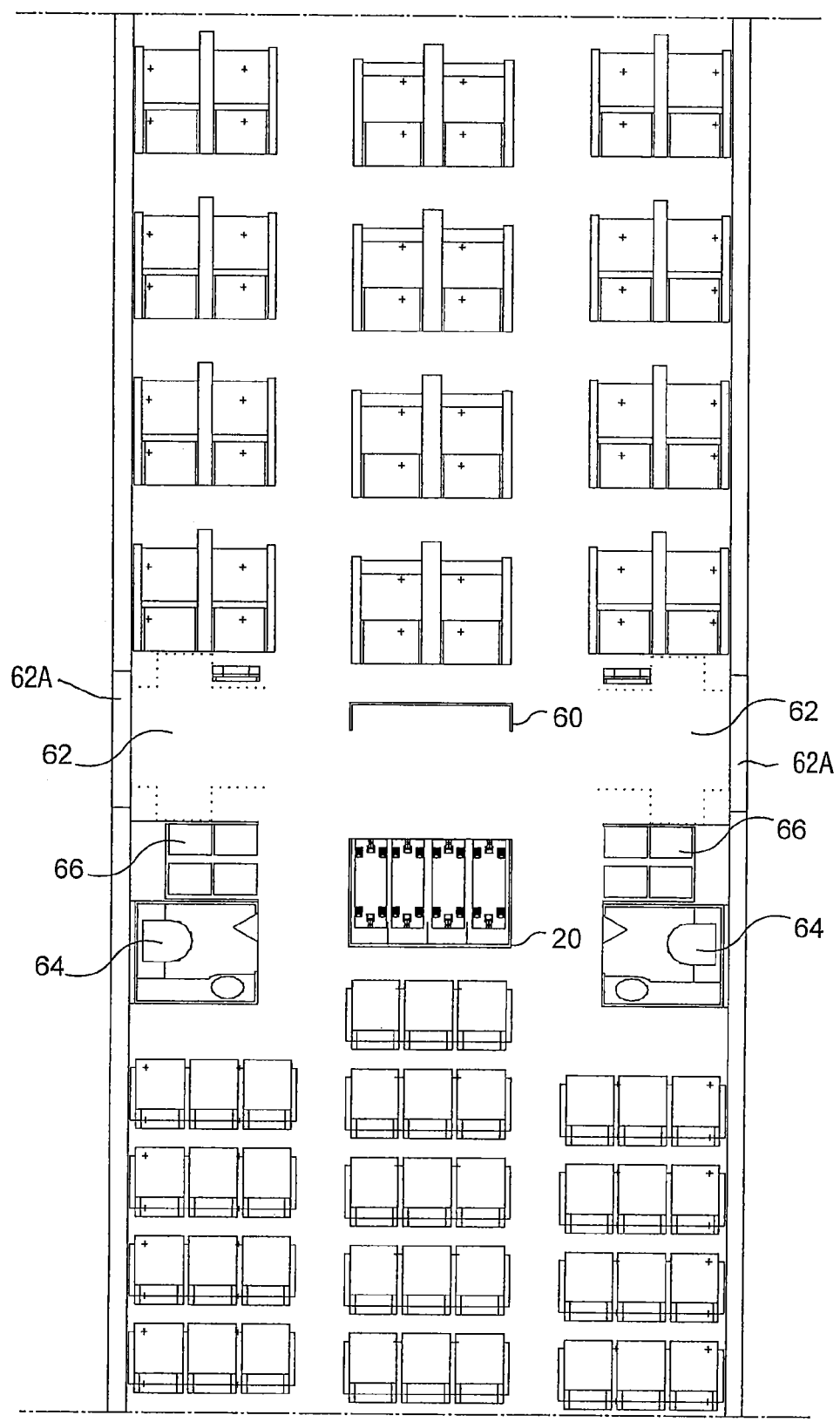

FIG. 10 is a view in perspective of a device according to the invention making it possible to see, by transparency, mechanical details of a device according to the invention, FIG. 11 is a detail view on an enlarged scale of FIG. 10 in a second position, FIGS. 12 and 13 correspond, on a reduced scale, to the view of FIG. 10 showing the device of this Figure in two other positions, FIGS. 14 and 15 correspond more or less to the view of FIG. 13 with moreover an additional cart, FIGS. 16 and 17 are detail views of a cargo hoist mechanism used in the device shown on the preceding Figures, FIG. 18 is a detail view on an enlarged scale showing a detail D of FIG. 5 made larger, FIGS. 19 and 20 show in perspective an optimized stowage device for carts according to the invention in two other embodiment variants, and FIG. 21 is a plan view of an aircraft cabin implementing a device according to this invention.

An aircraft fuselage 2 is seen in cross section on FIGS. 1 to 3. The interior of this fuselage is divided in two by a bridge 4 above which is a cabin 6 intended to accommodate passengers and below which is a hold 8 making it possible to accommodate for example baggage of the passengers traveling in cabin 6 and/or freight.

Carts 10 also are seen in a front view on FIGS. 1 to 3. Here it is a matter of standard carts that are commonly used on board an aircraft for serving meals and beverages to the passengers traveling on board this aircraft. The invention, however, is not limited to this type of carts and also relates for example to carts used for the transport and/or stowage of all types of objects: garments, garments on hangers, bedding, technical equipment, medical equipment, dishes, etc.

Here, in novel manner, carts 10 are stowed on three different levels. A compartment for twelve carts 10 is seen on FIG. 1. These carts 10 are arranged in three superposed rows of four carts 10.

A first row of four carts 10 is seen on FIG. 2. Above these carts 10 is a work surface 12, above and at a distance from which are equipment items making it possible to prepare meals. By way of example, there have been shown here three ovens 14, three coffee machines 16, and above these equipment items stowage drawers 18. Above these drawers, there again is a row of four carts 10.

The embodiment shown on FIG. 3 is an embodiment intermediate between the embodiment of FIG. 2 and that of FIG. 1. Whereas on FIG. 1 there is a unit 20 formed by walls 21 and accommodating twelve carts 10, on FIG. 2 a similar unit 20 (in particular of identical size) accommodates eight carts 10 and an equipment item making it possible to prepare meals, on FIG. 3 there is a unit 20 similar to units 20 of FIGS. 1 and 2 accommodating ten carts 10 and equipment items for the preparation of meals. In this third embodiment there is a lower row of four carts 10 and an upper row of four carts 10. At the level intermediate between these two rows are two carts 10 aligned side by side next to which is an equipment item for the preparation of meals, comprising an oven 14, two coffee machines 16 and two stowage drawers 18. There also is a work surface 12 here, small in comparison with the work surface of FIG. 2.

The following FIGS. 4 to 18 illustrate how to stow the carts placed upright and how to lower them. In the continuation of the description, a first compartment 22 receiving carts 10 and a second compartment 24 arranged above the first compartment and itself also receiving carts 10 will be considered.

It subsequently will be assumed that first cart compartment 22 is arranged at a lower level. This first compartment 22 corresponds more or less to a stowage compartment for carts 10 such as usually found in an aircraft. A floor 26, which subsequently will be assumed to be horizontal, for example, has been shown schematically on FIG. 4. This floor corresponds to the floor of cabin 6. First compartment 22 thus is of more or less parallelepipedal shape. It has a horizontal lower face which is in the plane of floor 26 (of course, for technical reasons, this lower face may be slightly slanted to facilitate the entry of carts 10 into the compartment or have a slight offset on the order of a few millimeters or on the order of a centimeter with the level of floor 26). First compartment 22, of parallelepipedal shape, is closed on five faces. Its open face subsequently will be called front face and it extends vertically. The front face of such a compartment generally does not have a door, but locking means are provided for each cart 10 so as to be able to keep them inside this first compartment 22.

Second compartment 24 has an overall shape similar to that of first compartment 22. Thus there again is found a parallelepipedal shape with a horizontal lower face and an open vertical front face. Second compartment 24 is arranged above first compartment 22. It is assumed here that second compartment 24 is the compartment of FIGS. 1 to 3 that receives the upper row of four carts 10. Second compartment 24 thus is arranged above first compartment 22 but at a distance from the latter. In this case, and in a preferred embodiment, second compartment 24 is perfectly aligned upright in relation to first compartment 22. The scope of the invention would not be overstepped here by choosing a second compartment with dimensions different from those of first compartment 22, or by offsetting second compartment 24 in relation to first compartment 22, or by placing second compartment 24 directly above first compartment 22.

A cargo hoist 28 having a horizontal platform 30 is arranged facing unit 20 receiving carts 10 in superposed manner.

Platform 30 is essentially flat and preferably has a more or less level upper surface, with no rim toward the top at its periphery. It is movable between two positions. The first position is illustrated for example on FIGS. 4 to 7, while the second position is illustrated for example on FIGS. 8 and 9. In the first position, referred to as upper position, platform 30 is more or less at the same height (and preferably at the same height) as the lower horizontal face of second compartment 24 and opposite same. In its second position, referred to as lower position, platform 30 comes to rest on floor 26 or, preferably, comes to fit into a groove of appropriate size, then allowing the upper face of platform 30 to be flush with floor 26 when platform 30 is in its extreme lower position. Preferably, when platform 30 is in its lower position, it does not hinder entry and exit of carts 10 located in first compartment 22. Platform 30, in its lower position, thus preferably is at the same height as the lower wall of first stowage compartment 22 for carts and opposite same.

A motorized mechanism not described in detail here allows movement of platform 30. A cargo hoist mechanism, for example a cargo hoist used in an aircraft, may be used again here. The mechanism shown on the drawings is illustrated in greater detail on FIGS. 16 and 17. On these Figures it is seen for example that platform 30 is installed at a right angle in relation to a vertical plate 32. The latter is fastened to a cart 34 installed sliding on a column 36 and driven by a motor 38 with the aid of belts 40. Preferably, this mechanism may be disengaged, in case for example of failure of motor 38, and then allows a manual activation of platform 30.

Transfer means are provided in order to allow transfer of carts 10 located in second compartment 24 to platform 30. These transfer means comprise two drawers 42. Each of these drawers 42 receives two carts 10. A drawer 42 is clearly seen for example on FIGS. 10 to 13. Each drawer 42 has a horizontal bottom 44 and three vertical side walls. One side wall, called central side wall 46, extends vertically in a plane perpendicular to the front face of second compartment 24 and is more or less at the center of second compartment 24. When each drawer 42 receives a set of two carts 10, the two central side walls 46 corresponding to the two drawers 42 each time are between the two sets of two carts 10. In the embodiment shown on the drawings, it has been chosen to use two electric motors 48 to drive each drawer 42. On the Figures, two power plants are seen, each of the plants shown containing two electric motors 48.

For each drawer 42, a first electric motor 48 is integral with unit 20, or more generally with second compartment 24, while second electric motor 48 is integral with platform 30. Each electric motor 48 drives, by means of a shaft 50, two cogwheels 52 each installed on shaft 50 at a distance from one another. Each of these cogwheels 52 cooperates with a rack 54 fastened horizontally onto a central side wall 46. As for shaft 50 bearing the two cogwheels 52, it extends vertically. In this way, when two cogwheels 52 of a shaft 50, each meshed with a rack 54, are driven in rotation by a corresponding electric motor 48, corresponding central side wall 46 is driven in translation along a horizontal direction.

The two electric motors 48 corresponding to a central side wall 46 make it possible to move this wall from a position in which it is completely inside second compartment 24 to a position in which it is on platform 30 completely outside of this second compartment 24. During almost all of the travel of central side wall 46, the latter is driven by the two corresponding electric motors 48. At the end of travel, depending on whether central side wall 46 is on platform 30 or inside second compartment 24, driving in translation is accomplished only by one of the two motors 48.

In the following paragraphs, it is described how carts 10 located in second compartment 24 may be lowered in order to be conveyed to floor 26. Platform 30 first of all is conveyed to the lower face of second compartment 24. The position of platform 30 in relation to second compartment 24 may be indexed or identified with the aid of sensors (not shown). A drawer 42 then is driven in translation by corresponding motors 48 in order to move the said drawer from its stowed position inside second compartment 24 to a position moved out on platform 30. It has been explained above how electric motors 48 act to drive drawer 42 in movement. The detail view of FIG. 18 shows that in order to achieve a good guidance of drawer 42 during this translatory movement, drawer 42 has beneath its bottom 44 a guidance rail 56 coming to cooperate with a corresponding groove 58. Groove 58 implemented in platform 30 has been shown on FIG. 18. This groove 58 also extends into the horizontal lower face of second compartment 24. Over by central side wall 46, there is a guidance that is achieved naturally at racks 54. Guidance rail 56 preferably will be at a distance from central side wall 46. A second guidance rail, near central side wall 46, also may be provided if need be.

When drawer 42 is completely on platform 30, that is to say when the vertical side face parallel to the front face of the second compartment is brought outside of compartment 24, the platform may begin its downward movement. This position is shown in particular on FIGS. 6 and 7 (on FIG. 6, a side wall of drawer 42 has been omitted in order to better show one of the two transported carts 10).

Platform 30 then is lowered to the position shown on FIGS. 8 and 9 (FIG. 8 here corresponds to FIG. 6, the same side wall of drawer 42 having been omitted). In this lower position, carts 10 located on platform 30 again are more or less at the same level as carts 10 shown on the drawings in first compartment 22. Platform 30 then is more or less at floor 26 and therefore at the lower wall of first compartment 22. As follows from the Figures, it also is opposite this first compartment 22.

In order to facilitate removal of a cart 10 from its drawer 42 in the lowered position thereof, it is provided to be able to retract vertical side wall 47 of drawer 42 opposite central side wall 46. FIGS. 14 and 15 illustrate a side wall 47 that retracts by sliding in a horizontal position parallel to central side wall 46. Any other means for retracting this side wall 47, when it exists, may be considered. In an embodiment variant, this vertical side wall 47 could be made to pivot around its lower horizontal stop. In this way, if the upper face of bottom 44 of drawer 42 is not flush with floor 46, then this side wall 47 in its folded back position may serve as a slanted plane facilitating loading and unloading of carts 10 into/from drawer 42.

It seems pointless here to describe how a cart 10 located at floor 26 can come to be placed in second compartment 24 arranged upright. The individual skilled in the art, in view of the preceding description, quickly will understand that by working conversely to the lowering of a cart, one succeeds in bringing this cart 10 back up to second compartment 24.

The individual skilled in the art also will understand without any difficulty how the described device may make it possible to raise and lower carts located in an intermediate position in cases of a unit 20 shown for example on FIGS. 1 and 3. The operation then is identical except that the position of platform 30 for transfer of carts 42 is adapted to the position of the intermediate compartment receiving carts 10.

The mechanics implemented here is very simple. In fact, platform 30 has only one degree of freedom. It translates only vertically, that is to say perpendicular to the plane of the platform. It comes to be positioned at the height of and each time opposite the lower wall of a stowage compartment for carts. When platform 30 is in low position, it itself may serve as a floor. It allows passage in front of the compartments for carts and may form part of a passage aisle. In its lower position it also forms a work space, in particular when a work surface 12 is provided in unit 20 (FIGS. 2 and 3 for example). In this way the area of platform 30 is a useful area and therefore is not a wasted area.

The solution proposed here thus provides for a platform that rises and descends between a high position facing a compartment and a low position at the flooring, as well as means for transfer of carts in the high position of the platform.

FIGS. 19 and 20 show embodiment variants allowing an even better optimization of the space at the device for optimized stowage according to the invention. As may be seen on the preceding Figures, the mechanism comprising in particular motor 38 and column 36 is accommodated inside a cabinet 60. In the embodiment of FIGS. 19 and 20, cabinet 60 is fitted out to be able to accommodate stowage drawers 18. In the embodiment of FIG. 19, stowage drawers 18 slide crosswise while in the embodiment of FIG. 20, they slide longitudinally. In both cases, a set of seven stowage drawers 18 has been provided on each side of the control mechanism for platform 30. Other drawers could have been provided but then it would have been necessary to provide a ladder or a step unit for accessing same.

FIG. 21 shows the positioning of a stowage device according to the invention in an aircraft cabin. FIG. 21 shows a cabin section at a door. In an aircraft, a set of two doors 62A arranged facing one another at the same level of the fuselage generally is called a door. A transverse aisle 62 thus is located at a door. A device for optimized stowage of carts according to this invention advantageously is arranged so that the space in which platform 30 of this device moves forms part of a transverse aisle 62 situated at a door of the aircraft. This allows an optimization of this space. In fact, the space in which platform 30 moves during an operation of loading/unloading of carts first of all is used for manipulation of the carts. This space is also useful for access to first compartment 22. In fact a free space is needed in front of this first compartment 22 so as to be able to have carts 10 return to and exit from this first compartment 22. This same space also may be used during the preparation of meals when the device for optimized storage of carts according to this invention has, for example, a configuration such as that shown on FIG. 2 or on FIG. 3. The cabin attendants need a space in which they move about in order to prepare meals. This space also may be used for this purpose. Finally, this same space may be used as a passage for access to the corresponding door.

In the embodiment shown on FIG. 21, all the carts 10 are stowed in the device for optimized stowage of carts according to the invention shown on this Figure. However, other locations for stowage of carts could be provided if necessary. For example, the presence of lavatories 64 is observed. A kitchen space 66 is next to the latter each time. This also, for example, could receive carts 10.

It is observed on FIG. 21 that carts 10 stowed in unit 20 are aligned parallel to the axis of aisle 62, which runs between unit 20 and cabinet 60.

Other positionings of a device for stowage of carts according to this invention may be considered. The platform of the device according to the invention preferably is located at an aisle of the cabin of the aircraft (or more generally of the vehicle considered) and may be used as a passage. The space located between the unit receiving the carts and the cabinet receiving the cargo hoist mechanism may be integrated just as easily into a longitudinal aisle as into a transverse aisle. The carts in the first compartment and in the second compartment also may be aligned crosswise (as shown on FIG. 21) just as easily as longitudinally (therefore pivoted by 90° in relation to the position shown on FIG. 21). A device for stowage of carts according to the invention also may be arranged independently of a door of the aircraft.

It is clearly apparent to the individual skilled in the art that the invention described above makes it possible to limit the necessary area in a cabin of an aircraft, or a train (or another vehicle for the transport of passengers) devoted to stowage of carts used for serving passengers. This saving of space in the cabin is implemented without having to encroach on the available space in the hold and without having to modify the structure of the aircraft. The invention thus is confined to a "simple" interior adjustment of the cabin not impacting the structure of the vehicle. The space gained, or saved, in this way may be turned to good account for accommodating a greater number of passengers (or for enhancing the comfort of the passengers).

It is observed that a device according to this invention is very adjustable. Depending on the available height, there may be two or three superposed rows of carts. Each row of carts may receive two, three, four (or more) carts.

The cargo hoist used for handling the carts also may be adapted. In the example described above, there could be, for example, two cargo hoists each with a platform able to receive a drawer and two carts. Having a cargo hoist intended to transport only one cart (or two carts), which is able to move facing the compartment containing the carts so as to become positioned just opposite a cart or a group of carts contained in a drawer, also may be considered.

This invention is not limited to the embodiments described above by way of non-limitative examples and shown on the drawings. It also relates to all embodiment variants within the capacity of the individual skilled in the art in the context of the claims below.

Thus for example, the technical solution adopted for example for the transfer of the carts to the cargo hoist could be replaced by other technical means. For example a system of jacks replacing the electric motors and the transmission by cogwheels described for moving the carts between the cargo hoist and the compartment serving for stowage thereof could be provided. Other technical solutions, not necessarily using a drawer, could be provided. For example, an arm equipped with a remote-controllable hook which would come to pull or push the cart during transfer thereof could be provided at the cargo hoist.

Likewise, for the cargo hoist mechanism, the embodiment adopted on the drawings goes back to that of a cargo hoist already used in an aircraft between two bridges. Other solutions, however, may be considered: electric, hydraulic, electro-hydraulic lift, scissor lift with a guidance system, magnetic mechanism, . . . . A solution making it possible to change over to manual activation mode in case of failure of the motor preferably will be chosen here. An entirely manual activation mode also could be considered if need be.

The invention claimed is:

1. A device on an aircraft for stowage of carts in a space including a floor, the device comprising:
    a plurality of service carts;
    a first compartment configured to receive the plurality of carts arranged side by side in a horizontal direction;
    a second compartment configured to receive a plurality of carts arranged side by side in a horizontal direction, and including an opening in a vertical wall of the compartment, the opening having a width in the horizontal direction sufficient to allow simultaneous entry and exit into and from the second compartment of the plurality of carts arranged side by side in the horizontal direction, wherein the second compartment is arranged above the first compartment;
    a platform substantially parallel to the floor and configured to move along a direction substantially perpendicular to the floor from a high position in which the platform is substantially at a horizontal lower wall of the second compartment, the platform being located outside the second compartment and facing the opening thereof, and a low position in which the platform is substantially at the floor; and
    means for transfer of the plurality of carts arranged in the second compartment from the second compartment to the platform and vice versa,
    wherein the platform has a width in the horizontal direction substantially equal to that of the opening of the second compartment.

2. A device according to claim 1, wherein the transfer means comprises a drawer having a horizontal lower face and at least one vertical side wall.

3. A device according to claim 2, wherein the drawer includes a retractable side wall.

4. A device according to claim 1, wherein the first compartment and the second compartment are arranged in a unit.

5. A device according to claim 4, wherein the unit also includes equipment items for preparation of meals.

6. A device according to claim 1, wherein the platform is a platform of a cargo hoist comprising:
    a vertical column, and
    a motor arranged to drive the platform along the vertical column.

7. A device according to claim 6, wherein the column and the motor are accommodated in a cabinet.

8. A device according to claim 7, wherein the cabinet further comprises stowage drawers.

9. An aircraft cabin comprising:
    a device for stowage of carts according to claim 1.

10. An aircraft cabin according to claim 9, wherein, when located at the low position, said platform is at an aisle.

11. An aircraft cabin according to claim 9, wherein the device for stowage of carts is at a position in the cabin, in a direction of the length of the cabin, which is also a position of an aircraft fuselage door for the cabin in the direction of the length of the cabin.

12. An aircraft cabin according to claim 11, wherein the passenger cabin includes at least two rows of passenger seats that are separated by an aisle, and wherein the device for stowage of carts is at a position in the cabin, in the direction of the length of the cabin, which is also the position of the aisle.

13. The device for stowage of carts according to claim 1, wherein the platform lacks a rim around a top periphery thereof.

14. The device according to claim 1, wherein in the low position, the platform is accommodated in a groove in the floor, the groove being of such depth that the upper face of the platform is flush with the floor.

15. The device according to claim 1, wherein in the low position, the platform rests on the floor.

16. The device according to claim 1, wherein, in the low position, the platform has substantially the same height as an opposing lower wall of the first compartment.

17. A device for stowage of carts in a space including a floor, the device comprising:
    a first compartment configured to receive at least one cart;
    a second compartment configured to receive at least one cart and including an opening allowing entry and exit of carts,
    wherein the second compartment is arranged above the first compartment;
    a platform substantially parallel to the floor and configured to move along a direction substantially perpendicular to the floor from a high position at which it is substantially at a horizontal lower wall of the second compartment facing the opening thereof and a low position at which it is substantially at the floor;
    a drawer having:
        a horizontal lower face,
        at least one vertical side wall, and
        a rack fastened onto the drawer;
    a first motor fixed in relation to the second compartment; and
    a second motor fixed in relation to the platform such that the second motor moves with the platform,
    wherein each motor is arranged to drive a respective cogwheel which is configured to mesh with the rack, and
    wherein the motors, cogwheels, and rack are configured to transfer the drawer and the at least one cart located thereon, from the platform to the second compartment and vice versa.

* * * * *